(12) United States Patent
Thukral

(10) Patent No.: US 7,716,283 B2
(45) Date of Patent: May 11, 2010

(54) TELEVISION SYSTEM VIDEO CONFERENCING

(75) Inventor: Vivek Thukral, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 11/058,762

(22) Filed: Feb. 16, 2005

(65) Prior Publication Data

US 2006/0184624 A1 Aug. 17, 2006

(51) Int. Cl.
G06F 15/16 (2006.01)
G06F 3/00 (2006.01)

(52) U.S. Cl. ............................. 709/204; 725/39; 725/40

(58) Field of Classification Search ................. 709/204; 725/39, 40
See application file for complete search history.

(56) References Cited

U.S. PATENT DOCUMENTS

| 5,828,839 | A * | 10/1998 | Moncreiff .................... 709/204 |
| 5,978,043 | A * | 11/1999 | Blonstein et al. ............ 348/569 |
| 5,978,835 | A * | 11/1999 | Ludwig et al. .............. 709/204 |
| 6,754,277 | B1 * | 6/2004 | Heinzelman et al. ... 375/240.27 |
| 6,772,436 | B1 * | 8/2004 | Doganata et al. ............ 725/106 |
| 2002/0023133 | A1 * | 2/2002 | Kato et al. ................... 709/205 |
| 2003/0193559 | A1 * | 10/2003 | Fernandez et al. ........ 348/14.08 |
| 2004/0181811 | A1 * | 9/2004 | Rakib ......................... 725/122 |
| 2004/0231003 | A1 * | 11/2004 | Cooper et al. ................ 725/135 |
| 2005/0060368 | A1 * | 3/2005 | Wang et al. .................. 709/204 |

* cited by examiner

*Primary Examiner*—Hassan Phillips
*Assistant Examiner*—Alan S Chou
(74) *Attorney, Agent, or Firm*—Lee & Hayes, PLLC

(57) ABSTRACT

Television system video conferencing is described. In an embodiment, a television-based client device receives program content from a content provider via an IP-based network to display a program for viewing. The client device generates video conference data to participate in a video conference session with one or more additional television-based client devices over the IP-based network. The client device communicates the video conference data to the content provider for association and distribution to the additional client devices, and receives incoming video conference data over a virtual channel designated for the video conference session. The incoming video conference data is hosted by the one or more additional client devices and is received from the content provider via the IP-based network. The client device then renders the incoming video conference data for television system video conferencing.

17 Claims, 9 Drawing Sheets

TELEVISION SYSTEM VIDEO CONFERENCING

TECHNICAL FIELD

This invention relates to video conferencing systems and methods.

BACKGROUND

Video conferencing is utilized for the communication of video images and audio between two or more participants of a video conference, and is increasingly used for such events as long-distance education courses, telemedicine, global business needs, and similar video conferencing applications. Video conferencing can be conducted via a PC to PC connection with video conferencing devices, such as a microphone and a Webcam, connected to input the audio and video data to the computing device and/or directly through a broadband connection.

Video conferencing systems that are commercially available today are typically for education and business applications, but are not economical for home or individual use. Individual subscribers to television-based services that are implemented via two-way networks, such as an IP-based network, can utilize interactive applications such as chat or instant messaging applications. However, such two-way interaction is limited to text and/or audio data, and there is currently not a provision for video image communication via a television-based service.

SUMMARY

Television system video conferencing is described herein.

In an implementation of television system video conferencing, a television-based client device receives program content from a content provider via an IP-based network to display a program for viewing. The client device generates video conference data to participate in a video conference session with one or more additional television-based client devices over the IP-based network. The client device communicates the video conference data to the content provider for association and distribution to the additional client devices, and receives incoming video conference data over a virtual channel designated for the video conference session. The incoming video conference data is hosted by the one or more additional client devices and is received from the content provider via the IP-based network. The client device then renders the incoming video conference data for television system video conferencing.

BRIEF DESCRIPTION OF THE DRAWINGS

The same numbers are used throughout the drawings to reference like features and components.

DETAILED DESCRIPTION

Television system video conferencing integrates a video conferencing architecture within a television viewing model and provides for live video interaction between one or more television viewers. Subscribers to a television service can receive television program content, such as movies, television shows, and the like, via an IP-based network from a content provider, such as from a cable company headend service. In addition, the content provider can dynamically create a television channel for a video conference session to which the subscribers can tune to participate in the video conference while still being able to watch other television channels.

The television channel created for the video conference session includes live services to be hosted by each individual client device corresponding to a subscriber that is a participant of the video conference session. The content provider also creates a channel map that lists the new television channel and associates the subscribers for the video conference session. Each client device that corresponds to a video conference participant encodes and communicates video conference data to the content provider in accordance with the channel map designation.

The content provider includes a content server that provides downstream communication of the services which are tunable at a client device just like any other tunable television channel. The client devices each tune to the video conference channel as designated in the channel map, and display the incoming channel as a PIP (picture-in-picture) or a full-screen window for television system video conferencing.

Additional subscribers can request to join the video conference session and can be included as a participant by simply adding a new service to the television channel that has already been provisioned for the video conference session. The television channel is then enabled for the new participant, and an update to the channel map is communicated to all of the subscriber's associated client devices such that the new participant is rendered for display as a member of the video conference session.

While aspects of the described systems and methods for television system video conferencing can be implemented in any number of different computing systems, environments, and/or configurations, embodiments of television system video conferencing are described in the context of the following exemplary system architectures.

Figure 1:
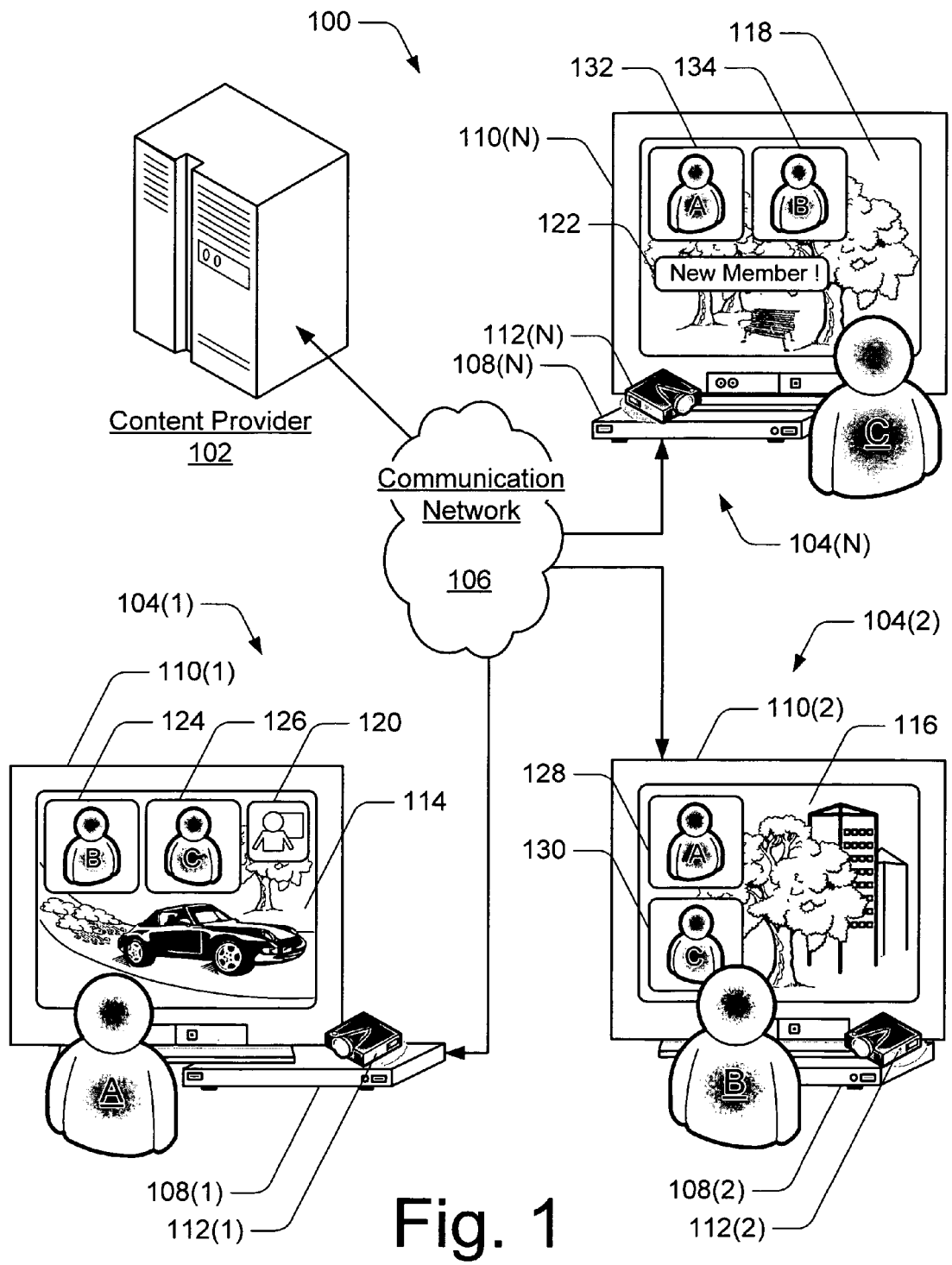
FIG. 1 illustrates an exemplary video conferencing system in which embodiments of television system video conferencing can be implemented.

FIG. 1 illustrates an exemplary video conferencing system 100 in which embodiments of television system video conferencing can be implemented. The video conferencing system 100 includes a content provider 102 and any number of television-based client systems 104(1-N). The client systems 104(1-N) are each configured for communication with the content provider 102 via a communication network 106 which, in this example, is an IP-based network.

Content provider 102 and/or the television-based client systems 104(1-N) may be implemented with any number and combination of differing components as further described below with reference to the exemplary computing and/or client device 800 shown in FIG. 8. Further, the video conferencing system 100 may be implemented with any number and combination of differing components as described below with reference to the exemplary computing environment 900 shown in FIG. 9.

The television-based client system 104(1) includes a client device 108(1), a display device 110(1), and video conferencing component(s) 112(1), such as a microphone, video camera, and/or Webcam. Similarly, the television-based client systems 104(2-N) include a respective client device 108(2-N), a respective display device 110(2-N), and respective video conferencing component(s) 112(2-N). Each client device 108 can be implemented in any number of embodiments, such as a set-top box, a digital video recorder (DVR) and playback system, a personal video recorder (PVR), an appliance device, and as any other type of client device that may be implemented in a television-based entertainment and information system.

The client devices 108(1-N) each receive program content from content provider 102 to display a program for viewing. For example, a program 114 is displayed on display device 110(1) of the television-based client system 104(1) for viewing. Similarly, a different program 116 is displayed on display device 110(2) of the television-based client system 104(2), and yet another program 118 is displayed on display device 110(N) of the television-based client system 104(N).

When the content provider 102 receives a request from a television-based client system 104 (e.g., from a subscriber) to join a video conference session, the content provider 102 associates the requesting client system with the video conference session and notifies other video conference session participants of the requesting client system association. For example, if client system 104(2) initiates a request to join a video conference session that includes client system 104(1) and 104(N), the content provider 102 associates client system 104(2) with the video conference session and communicates a notification 120 to client device 108(1), and communicates a notification 122 to client device 108(N). The illustrated notifications 120 and 122 are merely exemplary and may include any form of video, image, text, audio, and/or combination thereof.

Each client device 108 of a television-based client system 104 generates video conference data (e.g., audio and video data) for communication to content provider 102 via communication network 106. For example, client device 108(1) generates video conference data received from the video conferencing components 112(1) and communicates the video conference data to the content provider 102. The content provider 102 then controls distribution of the video conference data received from client device 108(1) to the television-based client systems 104(2-N). Similarly, client devices 108(2-N) generate video conference data received from the respective video conferencing components 112(2-N) and communicate the video conference data to the content provider 102 which controls distribution of the video conference data to the other television-based client systems 104. The content provider 102 associates the television-based client systems 104(1-N) for distribution of the video conference data received from each of the other respective client systems 104(1-N) via communication network 106.

Client device 108(1) of the television-based client system 104(1) receives video conference data hosted by client system 104(2) via content provider 102 and renders a video conferencing display 124 that corresponds to viewer B at client system 104(2). Client device 108(1) also receives video conference data hosted by client system 104(N) via content provider 102 and renders a video conferencing display 126 that corresponds to viewer C at client system 104(N). In this example, the video conferencing displays, such as video conferencing display 124, are illustrated as a picture-in-picture display. Alternatively, a video conferencing display can be rendered as a full-screen display on a display device 110 depending upon the resolution of the hosted service. The service resolution can be either a full-screen display or a PIP display depending upon the available upstream bandwidth and available hardware configuration of the client device 108 that hosts the service for the video conference session.

Client device 108(2) of the television-based client system 104(2) receives video conference data hosted by client system 104(1) via content provider 102 and renders a video conferencing display 128 that corresponds to viewer A at client system 104(1). Client device 108(2) also receives video conference data hosted by client system 104(N) via content provider 102 and renders a video conferencing display 130 that corresponds to viewer C at client system 104(N).

Similarly, client device 108(N) of the television-based client system 104(N) receives video conference data hosted by client system 104(1) via content provider 102 and renders a video conferencing display 132 that corresponds to viewer A at client system 104(1). Client device 108(N) also receives video conference data hosted by client system 104(2) via content provider 102 and renders a video conferencing display 134 that corresponds to viewer B at client system 104(2).

As an example of television system video conferencing in which a live video service can be hosted from individual subscribers' homes, viewer A at client system 104(1) may be watching a particular sporting event and determine that his friend, viewer B at client system 104(2), is on-line and can be contacted. Viewer A invites viewer B to join a video conference via a real-time notification while they are both watching the sporting event. When viewer B acknowledges the invitation, a new channel is dynamically provisioned for the video conference session, and the new channel includes two live services to be hosted by each of the respective subscriber client devices 108(1) and 108(2). From the perspective of client device 108(1), a service being hosted by client device 108(1) is also referred to as a local service, while a service being hosted by remote client device 108(2) is referred to as a remote service. When the new channel is dynamically provisioned, each client device 108(1) and 108(2) is updated and, without a user-selectable input, video conferencing display 124 is rendered on display 110(1) and video conferencing display 128 is rendered on display 110(2). Viewer A and viewer B can now communicate and see each other while watching the sporting event together.

Each participant of the video conference session can use an input device, such as a remote control, to control both the video conferencing display(s) that are rendered for viewing and generating the video conference data for communication to the content provider. Video conference session control includes commands such as stop, hold, start, join, leave, and the like. A viewer can also control the audio of the video conferencing display(s) and a program that is being displayed for viewing to avoid an audio conflict. In an embodiment, a remote control input can toggle enabling and disabling encoding of the audio for a local service. For example, enabling the audio would mute the television program and initiate that the video conferencing audio be encoded and streamed along with the video. Disabling the audio would then disable encoding the video conferencing audio and un-mute the television program.

Figure 2:
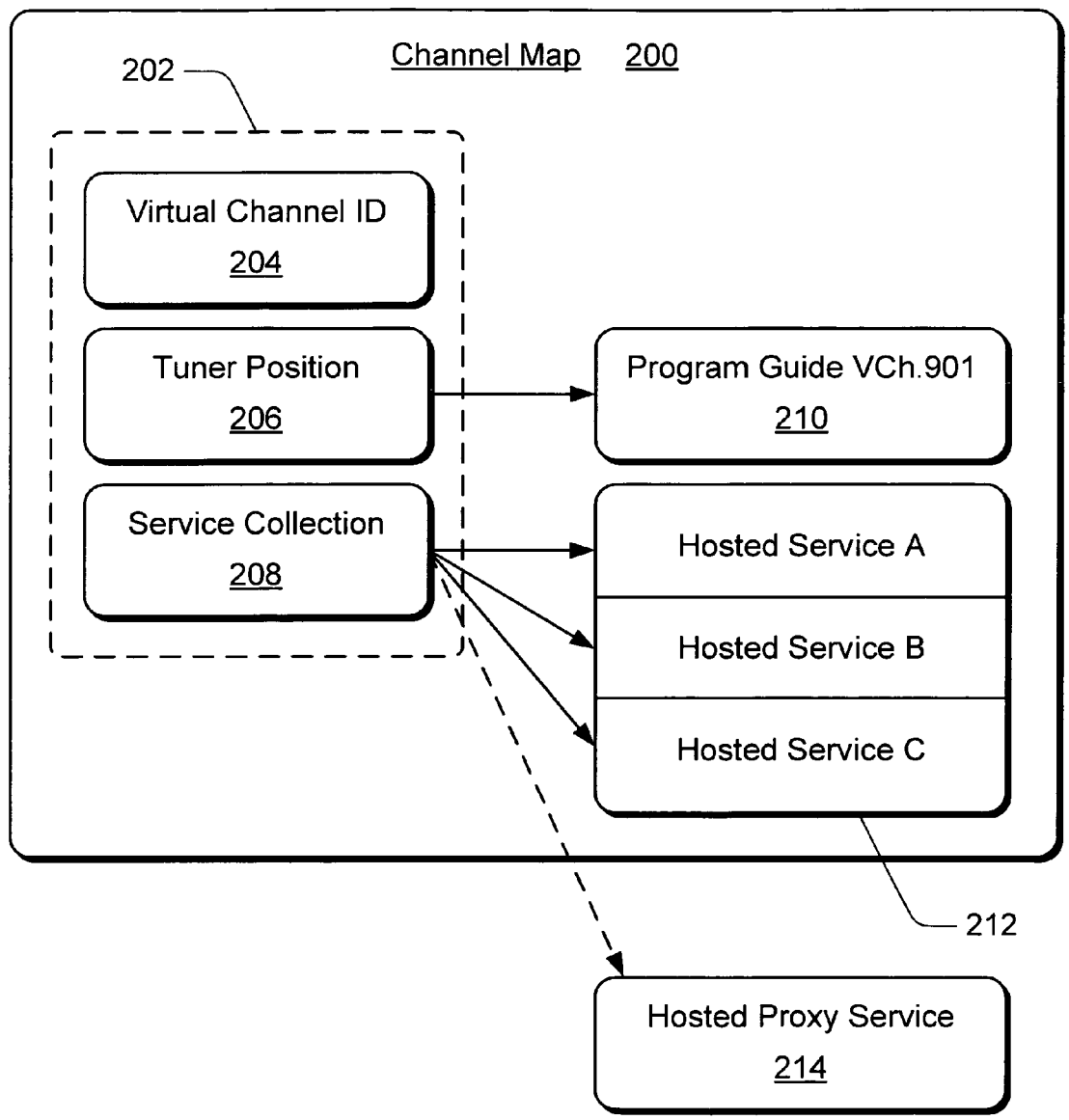
FIG. 2 illustrates an exemplary channel map for television system video conferencing, and is described with reference to the video conferencing system shown in FIG. 1.

FIG. 2 illustrates an exemplary channel map 200 for television system video conferencing, and is described with reference to the exemplary video conferencing system 100 shown in FIG. 1. The channel map 200 can be configured and maintained as a data structure by a component of the content provider 102, such as a channel manager, to facilitate a video conference session. Channel map 200 includes various identifiers and/or pointers 202 which, in this example, include a virtual channel identifier 204, a tuner position 206, and a service collection 208. The tuner position 206 identifies the virtual channel 210 in a program guide to which a subscriber can tune to participate in the video conference session.

The content provider 102, or a component thereof, creates the virtual channel on-demand in response to a request from a television-based client system 104 (e.g., a subscriber) to initiate the video conference session. The new television channel is created only for the participants of the video conference session, and it defines an audio-video service for each subscriber joined to the video conference session. The service collection 208 includes references to the hosted services 212, and associates the television-based client systems 104(1-N) that are authorized to participate in the video conference session. In this example, service collection 208 identifies and associates the television-based client system 104(1) (e.g., subscriber A), the television-based client system 104(2) (e.g., subscriber B), and the television-based client system 104(3) (e.g., subscriber C) with each other for the video conference session.

In an embodiment of television system video conferencing, all of the subscribers of a video conference session are associated, or subscribe to, the same headend service (e.g., content provider 102) which provides both television programming and Internet access via the IP-based network 106. In an alternate embodiment of television system video conferencing, the service collection 208 can reference a hosted proxy service 214 to support a subscriber as a video conference participant that is not a member of the same headend service as content provider 102. The content provider 102 communicates with the alternate subscriber through the hosted proxy service 214 between service providers.

Figure 3:
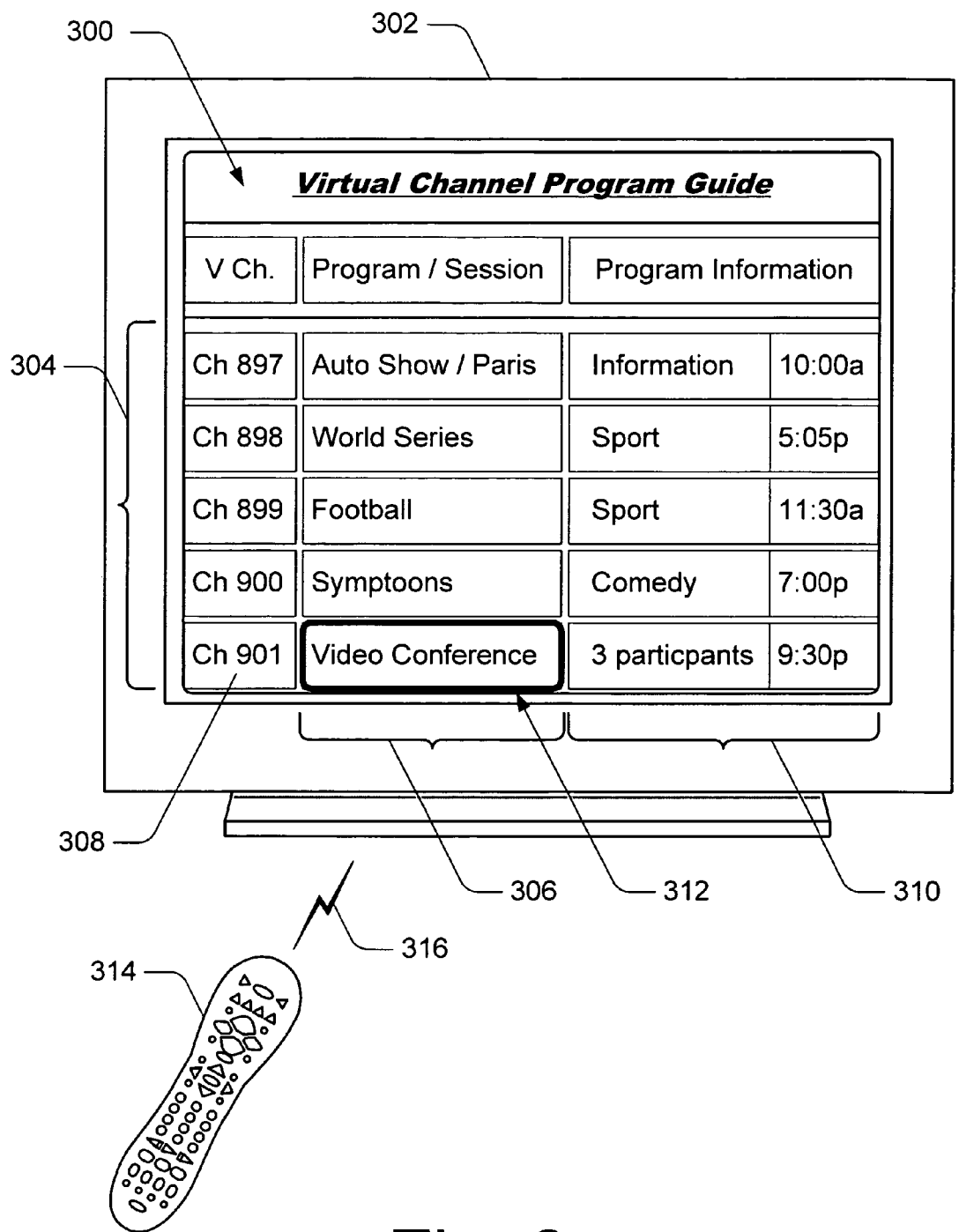
FIG. 3 illustrates an exemplary display of a virtual channel program guide for television system video conferencing.

FIG. 3 illustrates an exemplary virtual channel program guide 300 displayed on a display device 302 of a television-based client system, such as on a television 110 of a television-based client system 104 as shown in FIG. 1. Program guide 300 enables a viewer (e.g., a subscriber) to navigate a program grid 304, select a video conference session, and initiate receiving audio and video data hosted by one or more additional client systems participating in the video conference session. The program guide 300 includes a video conference session identifier 306, an associated channel identifier 308 (e.g., virtual channel 901 in this example), and additional information 310 about the video conference session.

The additional information 310 about a video conference session can include any combination of different information to inform a viewer about the video conference session, such as the time that the video conference session started, the number of participants at any one time, and the like. Although the channel identifier 308 is shown as virtual channel number nine-hundred-one (901), any available channel number can be provisioned as an on-demand virtual channel and can be assigned to a video conference session.

Program guide 300 includes a selectable control 312 shown implemented as an on-screen focus that can be positioned to identify the video conference session and, when selected, initiate receiving video conference data hosted by additional client systems participating in the video conference session. A viewer can move selectable control 312 within program guide 300, and can select the video conference session by manipulating an input device, such as remote control 314 via which the viewer can input control commands 316. Additionally, a viewer can tune away from a video conference session and can then tune back because the program guide includes a designation of the video conference session.

Figure 4:
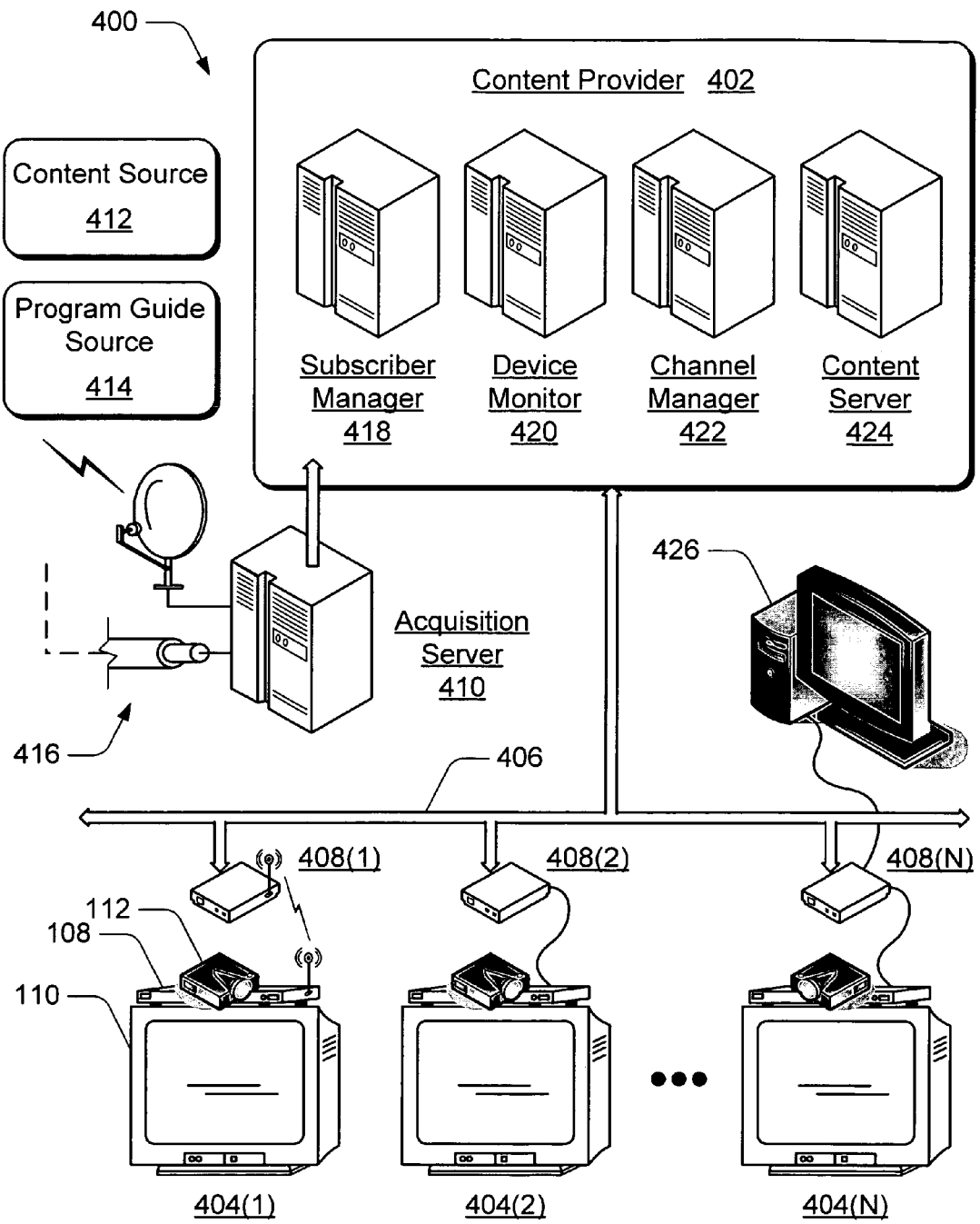
FIG. 4 illustrates various devices and components in an exemplary entertainment and information system in which embodiments of television system video conferencing can be implemented, such as the video conferencing system shown in FIG. 1.

FIG. 4 illustrates an exemplary entertainment and information system 400 in which an IP-based television environment can be implemented, and in which embodiments of television system video conferencing can be implemented. System 400 also facilitates the distribution of program content and program guide data to multiple viewers and includes a content provider 402 and television-based client systems 404(1-N) each configured for communication via a network 406. The network 406 can be implemented as a wide area network (e.g., the Internet), an intranet, a Digital Subscriber Line (DSL) network infrastructure, or as a point-to-point coupling infrastructure. Additionally, network 406 can be implemented using any type of network topology and any network communication protocol, and can be represented or otherwise implemented as a combination of two or more networks. A digital network can include various hardwired and/or wireless links 408(1-N), routers, gateways, and so on to facilitate communication between content provider 402 and the client systems 404(1-N).

System 400 includes an acquisition server 410 that receives program content from a content source 412, and program guide data from a program guide source 414. The program guide data is used to generate the program guide 300 (FIG. 3), for example. The content source 412 and the program guide source 414 control distribution of the program content and the program guide data to the acquisition server 410 via various transmission media 416, such as satellite transmission, radio frequency transmission, cable transmission, and/or via any number of other transmission media. In this example, acquisition server 410 is shown as an independent component of system 400 that communicates the program content and program guide data to content provider 402. In an alternate implementation, acquisition server 410 can be implemented as a component of content provider 402.

As used herein, "program(s)" and "program content" pertains to news shows, sitcoms, comedies, movies, commercials, talk shows, sporting events, on-demand videos, and any other form of television-based entertainment and information. Further, "recorded programs" include any of the aforementioned "programs" that have been recorded and that are maintained with a memory component as recorded programs, or that are maintained with a remote program data store. The "recorded programs" can also include any of the aforementioned "programs" that have been recorded and that are maintained at a broadcast center and/or at a headend that distributes the recorded programs to subscriber sites and to the client systems 404(1-N).

Content provider 402 is representative of a headend service in a television-based content distribution system, for example, that includes server(s) to provide the program content and associated data, as well as program guide data, to multiple subscribers (e.g., the television-based client systems 404(1-N)). The content provider 402 can be implemented as a satellite operator, a network television operator, a cable operator, and the like to control distribution of program content, such as movies, television programs, commercials, music, and other audio, video, and/or image content to the client systems 404(1-N).

Content provider 402 includes a subscriber manager 418, a device monitor 420, a channel manager 422, and a content server 424 (also referred to as an "edge server"). Although the various managers, servers, and monitors of content provider 402 (to include the acquisition server 410 in one embodiment) are illustrated and described as distributed, independent components of content provider 402, any one or more of the managers, servers, and monitors can be implemented together as a multi-functional component of content provider 402.

The subscriber manager 418 manages subscriber data, and the device monitor 420 monitors the client systems 404(1-N). The real-time state of the client systems 404(1-N) (e.g., the subscribers) can be maintained and monitored, such as whether a subscriber is on-line and can be contacted, the power on/off state of a respective client device 108, the logon/logoff state to an associated computing device, and the like.

The channel manager 422 implements various features and embodiments of television system video conferencing, such as generating a virtual channel and configuring channel map 200 (FIG. 2) for a video conferencing session. Content server 424 communicates the program content and the program data to the client systems 404(1-N). Content server 424 can also include stored on-demand content, such as video on-demand (VOD) movie content.

The television-based client systems 404(1-N) can be implemented with any number and combination of differing components as further described below with reference to the exemplary computing and/or client device 800 shown in FIG. 8. In this example, the television-based client systems 404(1-N) can be implemented to include a client device 108, a display device 110 (e.g., a television), and video conferencing component(s) 112 as described with reference to a television-based client system 104 shown in FIG. 1. Additionally, a client device 108 of a television-based client system 404 can be implemented in any number of embodiments, such as a set-top box, a digital video recorder (DVR) and playback system, a personal video recorder (PVR), an appliance device, and as any other type of client device that may be implemented in a television-based entertainment and information system.

A particular client device 108 of a television-based client system 404 can be coupled to any number of televisions 110 and/or similar devices that can be implemented to display or otherwise render program content or video conference data for television system video conferencing. Similarly, any number of the client devices 108 of the respective client systems 404(1-N) can be coupled to a single television 110. In an alternate embodiment, client system 404(N) is implemented with a computing device 426 as well as a client device 108. In an implementation of television system video conferencing, the client device tunes to the remote services while the computing device 426 generates (e.g., encodes) the video conference data hosted by client system 404(N) for communication from client system 404(N) to content provider 402.

Methods for television system video conferencing, such as exemplary methods 500, 600, and 700 described with reference to respective FIGS. 5, 6, and 7 may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
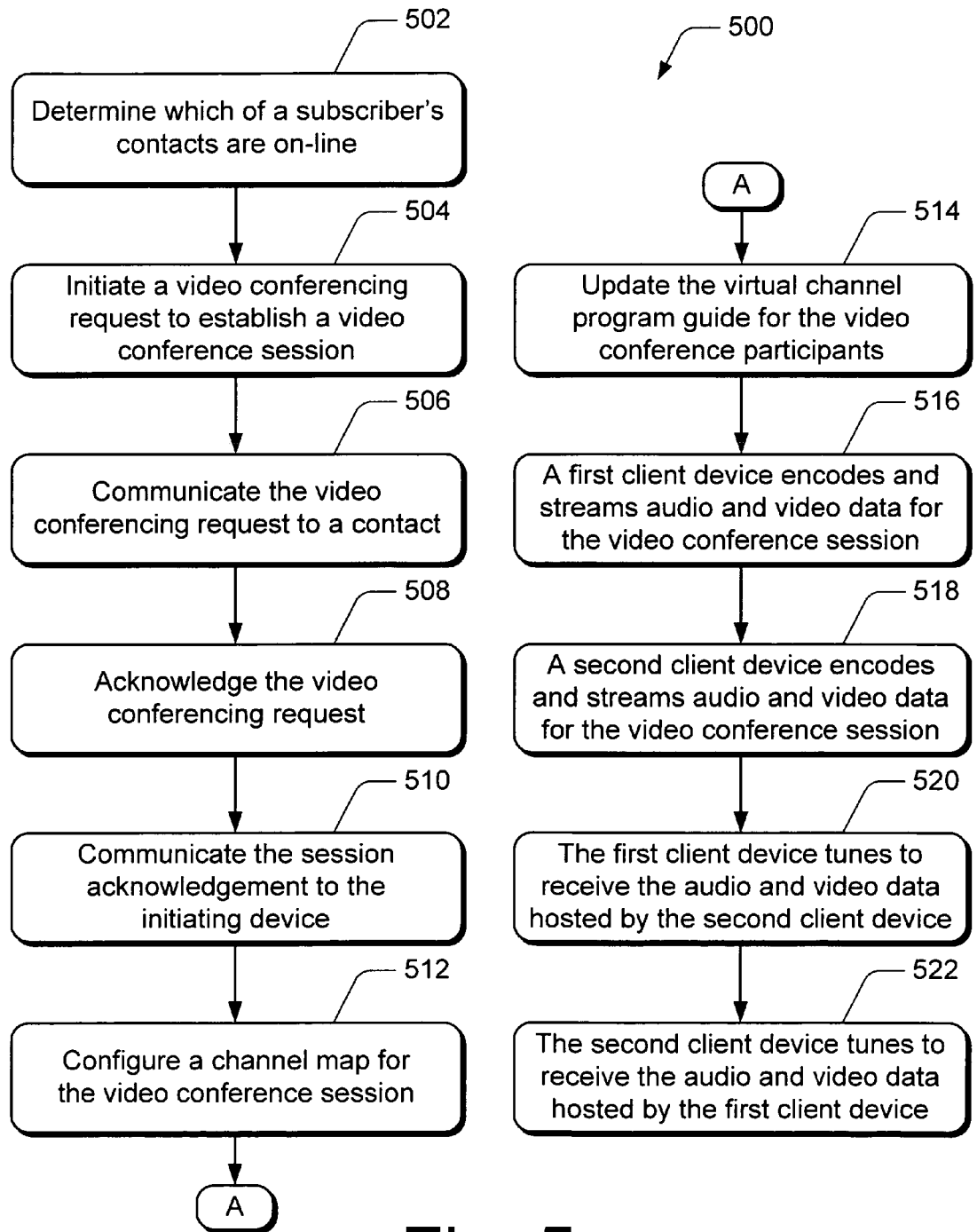
FIG. 5 is a flow diagram that illustrates an exemplary method of a video conference session sequence for television system video conferencing.

FIG. 5 illustrates an exemplary method 500 of a video conference session sequence for television system video conferencing. The order in which the method is described is not intended to be construed as a limitation, and any number of the described method blocks can be combined in any order to implement the method. Furthermore, the method can be implemented in any suitable hardware, software, firmware, or combination thereof.

At block 502, a first client device determines which of a subscriber's contacts are on-line. For example, a client system 404(1) (FIG. 4) requests the status of the subscriber's contacts (e.g., the subscriber associated with the particular client system) from the device monitor 420 of content provider 402. A subscriber's information is managed by the service provider (e.g., content provider 402). and a subscriber can browse and add one or more subscribers to his or her contact list. At block 504, the first client device initiates a video conferencing request to establish a video conference session with a second client device (e.g., an on-line contact). For example, client device 108 of the first client system 404(1) initiates a video conferencing request with the device monitor 420.

At block 506, the device monitor communicates the video conferencing request to the second client device (e.g., the on-line contact). For example, device monitor 420 communicates the video conferencing request from the first client system 404(1) to a second client system 404(2). At block 508, the second client system acknowledges the video conferencing request. For example, a client device of the second client system 404(2) communicates a video conference session acknowledgement to the device monitor 402.

At block 510, the device monitor communicates the session acknowledgment to the first client device. For example, device monitor 402 communicates the video conference session acknowledgement from the second client system 404(2) to the first client system 404(1) as a response to the video conferencing request. At block 512, the first client device initiates that a channel manager configure a channel map for the video conference session. For example, the client device 108 of the first client system 404(1) communicates a create channel request to channel manager 422, and the channel manager configures a channel map 200 (FIG. 2). The channel manager 422 communicates with the subscriber manager 418 to set the rights of the client devices for the respective client systems 404(1) and 404(2) for the video conference session. The channel manager 422 also communicates with the content server 424 to provision the services for the client systems 404(1) and 404(2).

At block 514, the device monitor communicates a virtual channel update for the program guide of each video conference session participant. For example, device monitor 422 communicates a virtual channel (e.g., tuner position designation) to each of the client devices for the respective client systems 404(1) and 404(2). The virtual channel identifier 306 and channel designation 308 is displayed in the program guide 300 (FIG. 3) at each of the client systems 404(1) and 404(2).

At block 516, the first client device encodes and streams audio and video data for television system video conferencing from the first client device. Similarly, the second client device encodes and streams audio and video data for television system video conferencing from the second client device, at block 518. For example, each of the client devices of the respective client systems 404(1) and 404(2) stream encoded audio and video data to content server 424 for the video conference session.

At block 520, the first client device tunes to the virtual channel to receive the audio and video data hosted by the second client device. Similarly, the second client device tunes to the virtual channel to receive the audio and video data hosted by the first client device, at block 522. For example, each of the client devices of the respective client systems 404(1) and 404(2) tune to the virtual channel 308 that is provisioned for the video conference session 306 in the virtual channel program guide 300. A first video conferencing display 124 (FIG. 1) is rendered for viewing on display device 110 associated with the first client system 404(1) (e.g., also client system 104(1) shown in FIG. 1), and a second video conferencing display 128 (FIG. 1) is rendered for viewing on a display device 110 associated with the second client system 404(2) (e.g., also client system 104(2) shown in FIG. 1).

Figure 6:
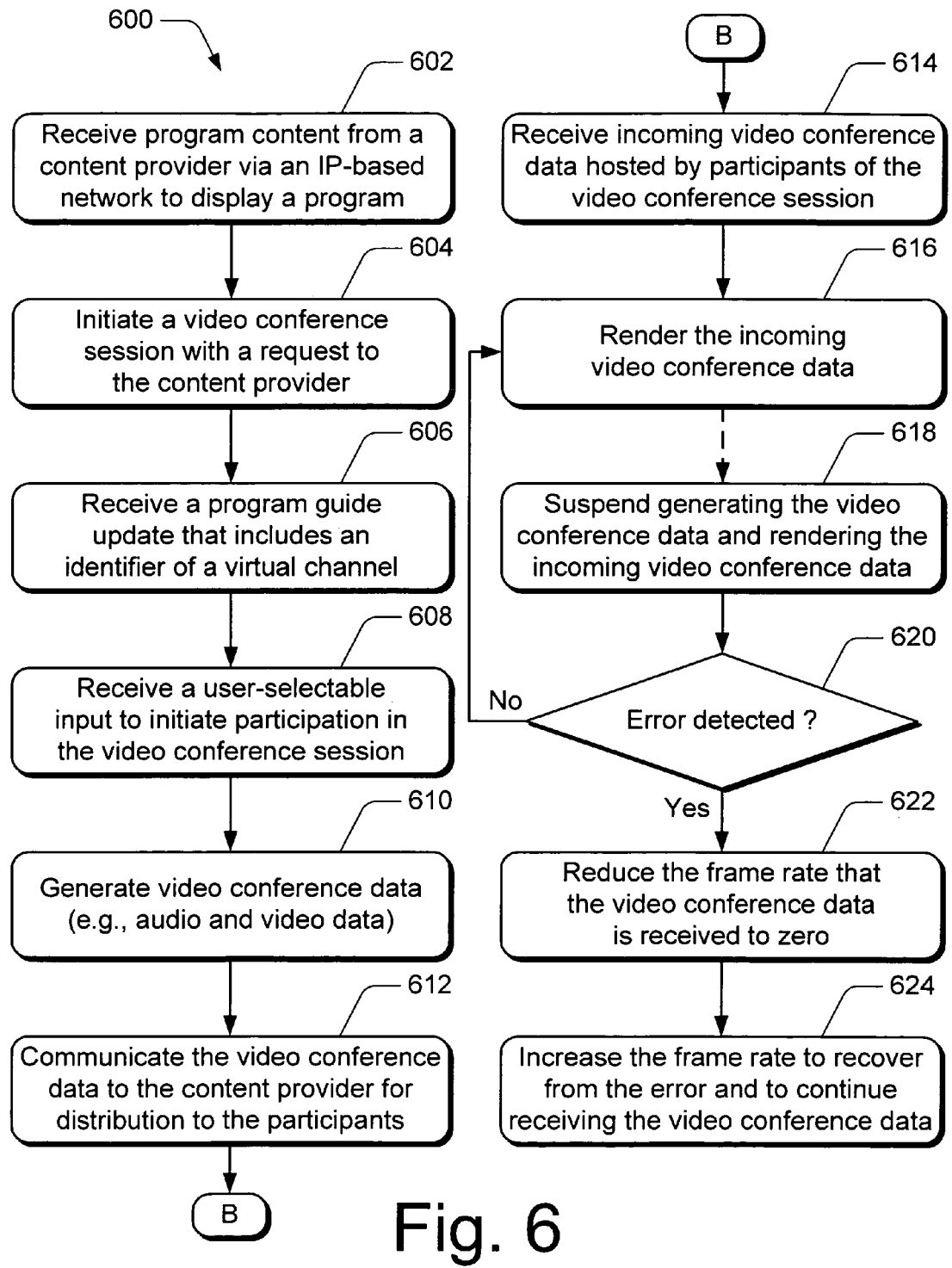
FIG. 6 is a flow diagram that illustrates an exemplary method for television system video conferencing.

FIG. 6 illustrates an exemplary method 600 for television system video conferencing and is described with reference to a television-based client system, such as a television-based client system 104 (FIG. 1) and a television-based client system 404 (FIG. 4). The order in which the method is described is not intended to be construed as a limitation, and any number of the described method blocks can be combined in any order to implement the method. Furthermore, the method can be implemented in any suitable hardware, software, firmware, or combination thereof.

At block 602, program content is received from a content provider via an IP-based network to display a program for viewing. For example, content provider 102 (FIG. 1) includes a server that communicates program content to the television-based client systems 104(1-N) via network 106. At block 604, a video conference session is initiated by communicating a request to the content provider to configure an association with at least one of the television-based systems. For example, client device 108(1) of the first client system 104(1) communicates a video conferencing request to content provider 102 to initiate a video conference session with the second client system 104(2).

At block 606, a program guide update is received that includes an identifier of a virtual channel which designates, or otherwise corresponds to, the video conference session. For example, content provider 102 generates channel map 200 (FIG. 2) that designates a tuner position 206 of a virtual channel 210 that corresponds to the video conference session. The first and second client systems 104(1) and 104(2) each receive an updated program guide 300 (FIG. 3) that includes the video conference designation 306 that corresponds to the video conference session.

At block 608, a user-selectable input of a virtual channel designation in a program guide is received to initiate participating in the video conference session. For example, client device 108(1) receives a user-selectable input 316 from remote control device 314 to select the video conference 312 from the program guide 300 and to initiate participation in the video conference session. At block 610, video conference data is generated to participate in the video conference session with one or more television-based systems over the IP-based network. For example, client device 108(1) of the first client system 104(1) receives audio and video data input from the video conferencing components 112(1) and generates the video conference data corresponding to the first subscriber (e.g., subscriber A in this example).

At block 612, the video conference data is communicated to the content provider for association and distribution to the one or more television-based systems (e.g., participants of the video conference session). For example, the first client device 108(1) communicates the video conference data corresponding to the first subscriber to the content provider 102 which, in turn, distributes the video conference data to the second client device 108(2) of the client system 104(2).

At block 614, incoming video conference data hosted by the one or more television-based systems is received over the virtual channel from the content provider via the IP-based network. For example, the first client device 108(1) receives video conference data hosted by the second client device 108(2) of the second client system 104(2). At block 616, the incoming video conference data hosted by the one or more television-based systems is rendered. For example, the video conference data hosted by client device 108(2) is received and a video conferencing display 124 is rendered that corresponds to subscriber B in this example.

Optionally at block 618, generating the video conference data and rendering the incoming video conference data is suspended without discontinuing an association with the video conference session. For example, a subscriber may want to "pause" his or her participation in the video conference session so that audio and/or video is not being communicated out from the person's home, for example. The subscriber can explicitly place the session on hold with a remote control input 316 via the remote control device 314 (FIG. 3).

Placing the session on hold does not disassociate the client device of a television-based client system from the video conference. Accordingly, it is not as processor-intensive and is less of an expense to resume participation in the video conference session than it would be to restart an association with the video conference session. In an embodiment, the video conference data packets are still being received, but are not decoded. When a subscriber chooses to resume participation in the video conference session, the participation is approximately immediate and the subscriber can toggle his or her participation. Maintaining the association with the video conference session also avoids a network spike caused by the connection setup that would be needed to restart an association with the video conference session.

If an error associated with rendering the incoming video conference data is detected at block 620, then a frame rate at which the video conference data is received is reduced to zero at block 622. Because the incoming video conference data (e.g., the audio and video data) has a presentation time requirement, data packets that are not properly delivered are dropped. At block 624, the frame rate is increased from zero to recover from the error and to continue receiving the video conference data hosted by the one or more television-based systems. The method 600 otherwise continues at block 616 to render the incoming video conference data.

Rather than decreasing the frame rate slowly, such as by one frame per second in an effort to clear an error, the frame rate is dropped to zero and started over, increasing by one frame per second, for example. The frame rate is increased as the incoming video conference data is successfully received and processed. Because the video image for a video conference session is not of a fast moving or changing image, but rather of a subscriber likely sitting in one position, the video image may be compromised only slightly and for only a moment which may not even be detectable to the other video conference session participants. Additionally, reducing the frame rate to zero when an error is detected allows the system to recover from the error faster than if the frame rate was decreased slowly in an effort to clear the error.

Figure 7:
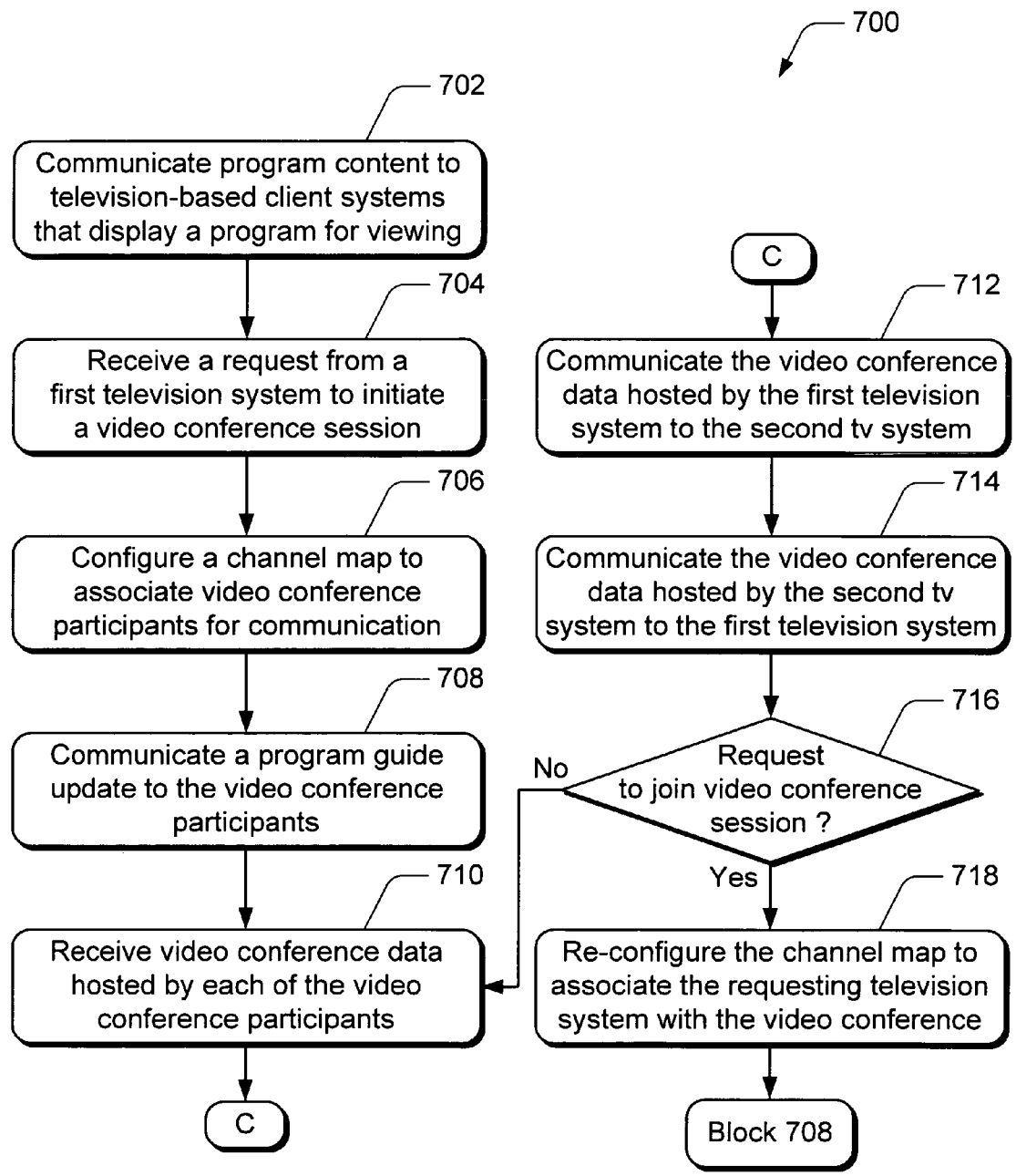
FIG. 7 is a flow diagram that illustrates another exemplary method for television system video conferencing.

FIG. 7 illustrates an exemplary method 700 for television system video conferencing and is described with reference to a content provider and/or a channel manager, such as content provider 102 (FIG. 1) and content provider 402 which includes channel manager 422 (FIG. 4). The order in which the method is described is not intended to be construed as a limitation, and any number of the described method blocks can be combined in any order to implement the method. Furthermore, the method can be implemented in any suitable hardware, software, firmware, or combination thereof.

At block 702, program content is communicated to television-based client systems that display a program for viewing. For example, content provider 102 (FIG. 1) includes a server that communicates program content to television-based client systems which include a first client system 104(1) and a second client system 104(2) that are each configured to host a video conference session. The program content is communicated from the content provider 102 to the television-based client systems 104 via the IP-based network 106 in this example.

At block 704, a request is received from the first television system to initiate a video conference session with the second television system. For example, client device 108(1) of the first client system 104(1) communicates a video conferencing request to content provider 102 to initiate a video conference session with the second client system 104(2).

At block 706, a channel map is configured to associate the first television system and the second television system (e.g., the video conference participants) for communication over a virtual channel that corresponds to the video conference session. For example, channel map 200 (FIG. 2) is configured to include an identifier 206 of a virtual channel 210, and a service collection 208 identifies and associates the first television-based client system 104(1) (e.g., subscriber A) with the second television-based client system 104(2) (e.g., subscriber B) for the video conference session.

At block 708, a program guide update is communicated to the first television system and to the second television system. The program guide update includes an identifier of the virtual channel designating the video conference session. The content provider 102 communicates an updated program guide 300 (FIG. 3) to the first and second television-based client systems 104(1) and 104(2), and the program guide 300 includes the virtual channel designation 308 that corresponds to the video conference session.

At block 710, video conference data hosted by each of the first television system and the second television system is received. For example, content provider 102 receives video conference data corresponding to the first subscriber from the first client device 108(1) of client system 104(1), and receives video conference data corresponding to the second subscriber from the second client device 108(2) of client system 104(2).

At block 712, the video conference data hosted by the first television system is communicated to be rendered by the second television system. At block 714, the video conference data hosted by the second television system is communicated to be rendered by the first television system. For example, content provider 102 communicates the video conference data corresponding to the first client system 104(1) to the second client device 108(2) via the IP-based network 106, and communicates the video conference data corresponding to the second client system 104(2) to the second client device 108(1) via the IP-based network 106.

If a request is received from a third television system to join the video conference session at block 716, then the channel map is re-configured to associate the third television system for communication over the virtual channel, at block 718. For example, content provider 102 updates the channel map 200 such that the service collection 208 includes the television-based client system 104(N) (e.g., subscriber C) to identify and associate the third client system 104(N) with the video conference session participants 104(1) and 104(2). The method continues at block 708 to communicate the updated program guide to the video conference session participants (e.g., the television-based client systems 104(1-N)). The method 700 otherwise continues from block 716 to block 710 to continue receive incoming video conference data from the video conference session participants.

Figure 8:
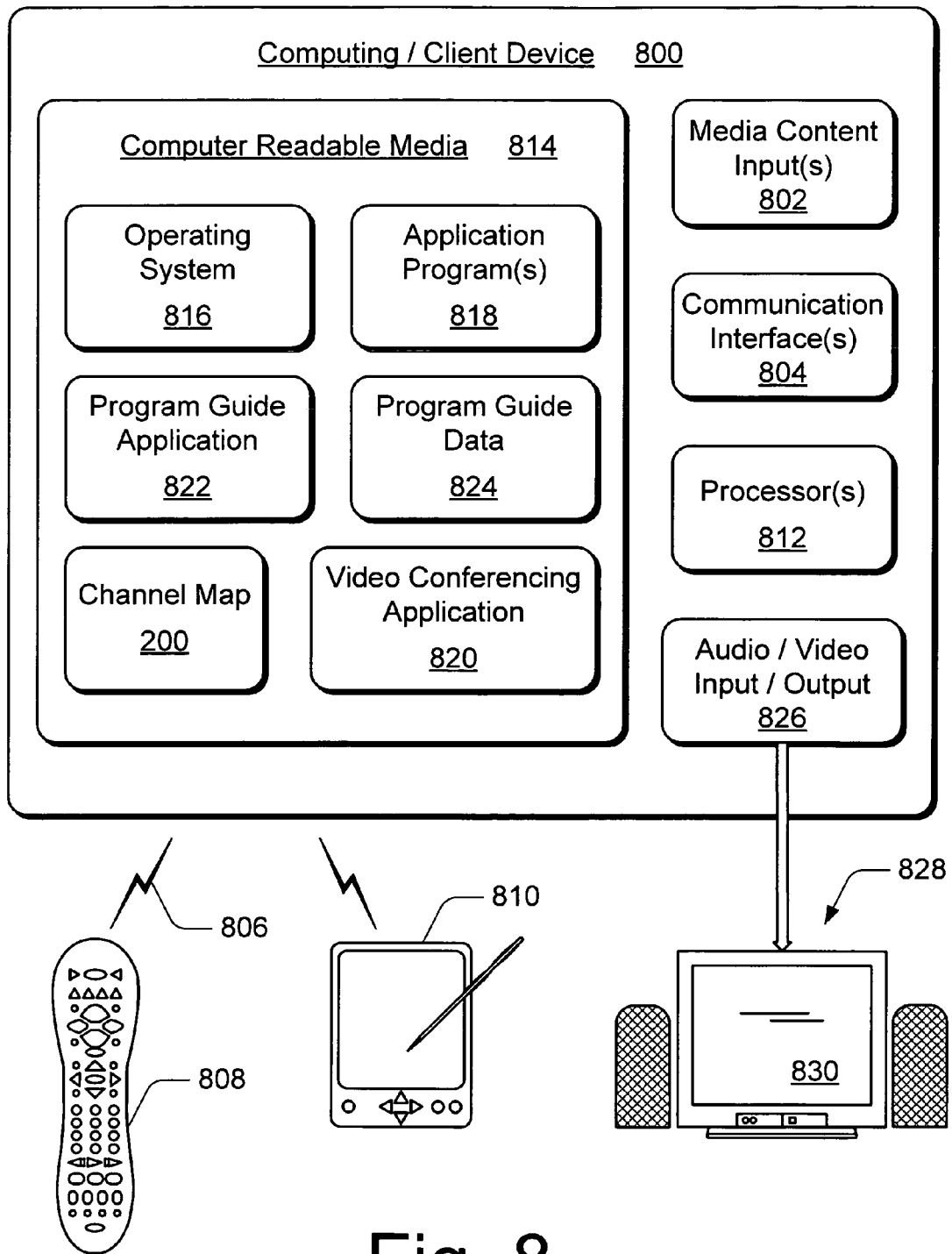
FIG. 8 illustrates various components of an exemplary computing and/or client device that can be implemented as any one or more of the video conferencing system components and devices shown in FIG. 1, and/or as the various devices and components in the IP-based television environment shown in FIG. 4.

FIG. 8 illustrates various components of an exemplary computing and/or client device 800 in which embodiments of television system video conferencing can be implemented. Further, the computing and/or client device 800 can be implemented as computing device 426 (FIG. 4), as any one or more of the client devices 108 described with reference to FIGS. 1 and 4, and as any one or more of the servers, monitors, and managers of content provider 402 described with reference to FIGS. 1 and 4. The device 800 can also be implemented as any form of computing or electronic device with any number and combination of differing components as described below with reference to the exemplary computing environment 900 shown in FIG. 9.

Computing and/or client device 800 includes one or more media content inputs 802 which may include Internet Protocol (IP) inputs over which streams of media content are received via an IP-based network. Device 800 further includes communication interface(s) 804 which can be implemented as any one or more of a serial and/or parallel interface, a wireless interface, any type of network interface, a modem, and as any other type of communication interface. A wireless interface enables device 800 to receive control input commands 806 and other information from an input device, such as from remote control device 808, PDA (personal digital assistant) 810, cellular phone, or from another infrared (IR), 802.11, Bluetooth, or similar RF input device.

A network interface provides a connection between the computing and/or client device 800 and a communication network (e.g., networks 106 and 406 shown in respective FIGS. 1 and 4) by which other electronic and computing devices can communicate data with device 800. Similarly, a serial and/or parallel interface provides for data communication directly between device 800 and the other electronic or computing devices. A modem facilitates device 800 communication with other electronic and computing devices via a conventional telephone line, a DSL connection, cable, and/or other type of connection.

Computing and/or client device 800 also includes one or more processors 812 (e.g., any of microprocessors, controllers, and the like) which process various computer executable instructions to control the operation of device 800, to communicate with other electronic and computing devices, and to implement embodiments of television system video conferencing. Device 800 can be implemented with computer readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 814 provides data storage mechanisms to store various information and/or data such as software applications and any other types of information and data related to operational aspects of the computing and/or client device 800. For example, an operating system 816 and/or other application programs 818 can be maintained as software applications with the computer readable media 814 and executed on processor(s) 812 to implement embodiments of television system video conferencing.

For example, when device 800 is implemented as a content provider 102 (FIG. 1) or 402 (FIG. 4) and/or as a channel manager 422, computer readable media 814 maintains the channel map 200 shown in FIG. 2 to implement a video conferencing session. When device 800 is implemented as a client device 108 in a television-based client system 104 (FIG. 1) or 404 (FIG. 4), or as computing device 426 (FIG. 4), computer readable media 814 maintains a video conferencing application 820 to implement embodiments of television system video conferencing.

Although the video conferencing application 820 is illustrated and described as a single application configured to implement embodiments of television system video conferencing, the video conferencing application 820 can be implemented as several component applications distributed to each perform one or more functions in a client device in a television-based entertainment and information system.

The computer readable media 814 also includes a program guide application 822 that is implemented to process program guide data 824 and generate program guides for display which enable a viewer to navigate through an onscreen display and locate a video conference session, broadcast programs, recorded programs, video on-demand programs and movies, interactive game selections, and other media access information or content of interest to the viewer. For example, the program guide application 822 generates program guide 300 (FIG. 3) which enables a viewer to navigate and select video conference 306 on virtual channel 901.

The computing and/or client device 800 also includes an audio and/or video output 826 that provides audio and video to an audio rendering and/or display system 828, or to other devices that process, display, and/or otherwise render audio, video, and display data. Video signals and audio signals can be communicated from device 800 to television 830 via an RF (radio frequency) link, S-video link, composite video link, component video link, analog audio connection, or other similar communication link.

Figure 9:
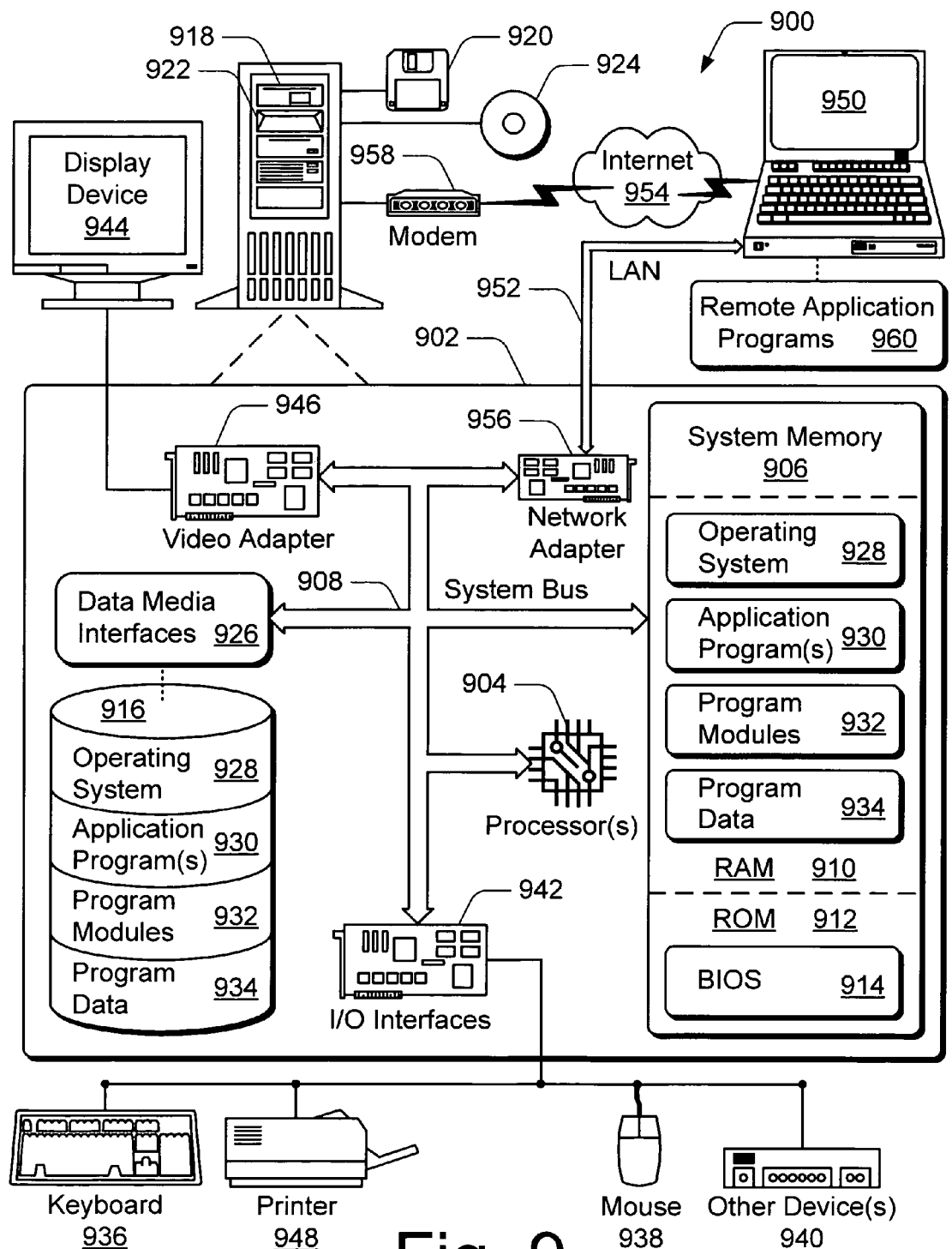
FIG. 9 illustrates exemplary computing systems, devices, and components in an environment that television system video conferencing can be implemented.

FIG. 9 illustrates an exemplary computing environment 900 within which television system video conferencing systems and methods, as well as the computing, network, and system architectures described herein, can be either fully or partially implemented. Exemplary computing environment 900 is only one example of a computing system and is not intended to suggest any limitation as to the scope of use or functionality of the architectures. Neither should the computing environment 900 be interpreted as having any dependency or requirement relating to any one or combination of components illustrated in the exemplary computing environment 900.

The computer and network architectures in computing environment 900 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 900 includes a general-purpose computing system in the form of a computing device 902. The components of computing device 902 can include, but are not limited to, one or more processors 904 (e.g., any of microprocessors, controllers, and the like), a system memory 906, and a system bus 908 that couples the various system components. The one or more processors 904 process various computer executable instructions to control the operation of computing device 902 and to communicate with other electronic and computing devices. The system bus 908 represents any number of several types of bus structures, including a memory bus or memory controller, a peripheral bus, an accelerated graphics port, and a processor or local bus using any of a variety of bus architectures.

Computing environment 900 includes a variety of computer readable media which can be any media that is accessible by computing device 902 and includes both volatile and non-volatile media, removable and non-removable media. The system memory 906 includes computer readable media in the form of volatile memory, such as random access memory (RAM) 910, and/or non-volatile memory, such as read only memory (ROM) 912. A basic input/output system (BIOS) 914 maintains the basic routines that facilitate information transfer between components within computing device 902, such as during start-up, and is stored in ROM 912. RAM 910 typically contains data and/or program modules that are immediately accessible to and/or presently operated on by one or more of the processors 904.

Computing device 902 may include other removable/non-removable, volatile/non-volatile computer storage media. By way of example, a hard disk drive 916 reads from and writes to a non-removable, non-volatile magnetic media (not shown), a magnetic disk drive 918 reads from and writes to a removable, non-volatile magnetic disk 920 (e.g., a "floppy disk"), and an optical disk drive 922 reads from and/or writes to a removable, non-volatile optical disk 924 such as a CD-ROM, digital versatile disk (DVD), or any other type of optical media. In this example, the hard disk drive 916, magnetic disk drive 918, and optical disk drive 922 are each connected to the system bus 908 by one or more data media interfaces 926. The disk drives and associated computer readable media provide non-volatile storage of computer readable instructions, data structures, program modules, and other data for computing device 902.

Any number of program modules can be stored on RAM 910, ROM 912, hard disk 916, magnetic disk 920, and/or optical disk 924, including by way of example, an operating system 928, one or more application programs 930, other program modules 932, and program data 934. Each of such operating system 928, application program(s) 930, other program modules 932, program data 934, or any combination thereof, may include one or more embodiments of the systems and methods described herein.

Computing device 902 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 902 via any number of different input devices such as a keyboard 936 and pointing device 938 (e.g., a "mouse"). Other input devices 940 (not shown specifically) may include a microphone, joystick, game pad, controller, satellite dish, serial port, scanner, and/or the like. These and other input devices are connected to the processors 904 via input/output interfaces 942 that are coupled to the system bus 908, but may be connected by other interface and bus structures, such as a parallel port, game port, and/or a universal serial bus (USB).

A display device 944 (or other type of monitor) can be connected to the system bus 908 via an interface, such as a video adapter 946. In addition to the display device 944, other output peripheral devices can include components such as speakers (not shown) and a printer 948 which can be connected to computing device 902 via the input/output interfaces 942.

Computing device 902 can operate in a networked environment using logical connections to one or more remote computers, such as remote computing device 950. By way of example, remote computing device 950 can be a personal computer, portable computer, a server, a router, a network computer, a peer device or other common network node, and the like. The remote computing device 950 is illustrated as a portable computer that can include any number and combination of the different components, elements, and features described herein relative to computing device 902.

Logical connections between computing device 902 and the remote computing device 950 are depicted as a local area network (LAN) 952 and a general wide area network (WAN) 954. Such networking environments are commonplace in offices, enterprise-wide computer networks, intranets, and the Internet. When implemented in a LAN networking environment, the computing device 902 is connected to a local network 952 via a network interface or adapter 956. When implemented in a WAN networking environment, the computing device 902 typically includes a modem 958 or other means for establishing communications over the wide area network 954. The modem 958 can be internal or external to computing device 902, and can be connected to the system bus 908 via the input/output interfaces 942 or other appropriate mechanisms. The illustrated network connections are merely exemplary and other means of establishing communication link(s) between the computing devices 902 and 950 can be utilized.

In a networked environment, such as that illustrated with computing environment 900, program modules depicted relative to the computing device 902, or portions thereof, may be stored in a remote memory storage device. By way of example, remote application programs 960 are maintained with a memory device of remote computing device 950. For purposes of illustration, application programs and other executable program components, such as operating system 928, are illustrated herein as discrete blocks, although it is recognized that such programs and components reside at various times in different storage components of the computing device 902, and are executed by the one or more processors 904 of the computing device 902.

Although embodiments of television system video conferencing have been described in language specific to structural features and/or methods, it is to be understood that the subject of the appended claims is not necessarily limited to the specific features or methods described. Rather, the specific features and methods are disclosed as exemplary implementations of television system video conferencing.

The invention claimed is:

1. A video conferencing system, comprising:
   television-based systems including at least a first television system and a second television system each configured to host a video conference session;
   the first television system being configured to receive program content from a content provider to display a program for viewing, generate video conference data corresponding to the first television system, and render video conference data hosted by the second television system;
   the second television system being configured to receive the program content from the content provider to display the program for viewing, generate video conference data corresponding to the second television system, and render video conference data hosted by the first television system;
   a program guide having a first listing of the program content; and
   a channel manager configured to associate the first television system and the second television system for communication of the respective video conference data via an IP-based network and dynamically create a virtual channel in response to a request to initiate the video conference session by the first or the second television system and associate the first and second television systems for communication over the virtual channel, and further the channel manager automatically updates the program guide to a second listing of the program content including a tuner position of the virtual channel from which a user of the first or second television system can select to participate in the video conference session, with the virtual channel being a newly created channel in the second listing of the program guide.

2. A video conferencing system as recited in claim 1, wherein the first television system is further configured to render video conference data hosted by one or more additional television systems.

3. A video conferencing system as recited in claim 1, wherein the program content and the video conference data is communicated to the first television system from the content provider via the IP based network.

4. A video conferencing system as recited in claim 1, wherein the channel manger is further configured to receive a request from a third television system to join the video conference session, and is further configured to associate the third television system with the video conference session and notify the first television system and the second television system of the third television system association.

5. A video conferencing system as recited in claim 1, wherein the channel manager is further configured to generate a channel map to associate the first television system and the second television system for communication, the channel map including a virtual channel identifier and a service collection that identifies and associates the first television system with the second television system.

6. A video conferencing system as recited in claim 1, wherein the first television system is further configured to suspend generating the video conference data corresponding to the first television system and suspend rendering the video conference data hosted by the second television system without discontinuing an association with the video conference session.

7. A video conferencing system as recited in claim 1, wherein the first television system is further configured to:
   detect an error associated with rendering the video conference data hosted by the second television system;

reduce a frame rate at which the video conference data is received to zero; and increase the frame rate from zero to recover from the error and to continue receiving the video conference data hosted by the second television system.

8. A video conferencing system as recited in claim 1, wherein one of the first and second television systems are connected to the content provider via a proxy service.

9. A method, comprising:

receiving program content from a content provider via an IP-based network to display a program for viewing;

receiving a program guide having a first listing of the program content;

generating video conference data to participate in a video conference session with one or more television-based systems over the IP-based network;

communicating the video conference data to the content provider for association and distribution to the one or more television-based systems;

dynamically creating a virtual channel in response to a request to initiate the video conference session by a television-based system of the one or more television-based systems and associate the television-based systems for communication over the virtual channel;

automatically updating the program guide to a second listing by the content provider without user interaction, the second listing of the program guide including a tuner position of the virtual channel from which a user of the television-based systems can select to participate in the video conference session, with the virtual channel being a newly created channel in the program guide;

receiving the second listing of the program guide;

receiving incoming video conference data over the virtual channel, the incoming video conference data being hosted by the one or more television-based systems and being received from the content provider via the IP-based network; and rendering the incoming video conference data hosted by the one or more television-based systems.

10. A method as recited in claim 9, further comprising suspending generating the video conference data and suspending rendering the incoming video conference data without discontinuing an association with the video conference session.

11. A method as recited in claim 9, further comprising:

detecting an error associated with rendering the incoming video conference data hosted by the one or more television-based systems;

reducing a frame rate at which the video conference data is received to zero; and increasing the frame rate from zero to recover from the error and to continue receiving the video conference data hosted by the one or more television based systems.

12. One or more computer readable non-transitory media comprising computer executable instructions that, when executed, direct a content provider to:

communicate program content to television-based systems that display a program for viewing, the television-based systems including at least a first television system and a second television system each configured to host a video conference session;

receive a program guide having a first listing of the program content;

receive a request from the first television system to initiate the video conference session with at least the second television system;

dynamically create a virtual channel in response to a request to initiate the video conference session by a television-based system of the one or more television-based systems and associate the television-based systems for communication over the virtual channel;

configure a channel map to associate the first television system and the second television system for communication over the virtual channel that designates the video conference session;

automatically update the program guide to a second listing by the content provider, the second listing of the program guide including a tuner position of the virtual channel from which a user of the television-based systems can select to participate in the video conference session, with the virtual channel being a newly created channel in the program guide and not previously being a part of the first listing of the program guide;

receiving the second listing of the program guide:

receive video conference data hosted by each of the first television system and the second television system over the virtual channel;

communicate the video conference data hosted by the first television system to the second television system over the virtual channel to be rendered by the second television system; and communicate the video conference data hosted by the second television system to the first television system over the video conference to be rendered by the first television system.

13. One or more computer readable non-transitory media as recited in claim 12, further comprising computer executable instructions that, when executed, direct the content provider to communicate the program content to the television-based systems via an IP-based network, and communicate the video conference data to each of the first television system and the second television system via the IP based network.

14. One or more computer readable non-transitory media as recited in claim 12, further comprising computer executable instructions that, when executed, direct the content provider to configure the channel map to include an identifier of the virtual channel and a service collection that identifies and associates the first television system with the second television system for the video conference session.

15. One or more computer readable non-transitory media as recited in claim 12, further comprising computer executable instructions that, when executed, direct the content provider to communicate a program guide update to the first television system and to the second television system, the program guide update including an identifier of the virtual channel corresponding to the video conference session.

16. One or more computer readable non-transitory media as recited in claim 12, further comprising computer executable instructions that, when executed, direct the content provider to:

receive a request from a third television system to join the video conference session;

re-configure the channel map to associate the third television system for communication over the virtual channel; and notify the first television system and the second television system of the third television system association.

17. One or more computer readable non-transitory media as recited in claim 12, wherein the first television system comprises a computing device and a client device and wherein the client device of the first television system receives the video conference data and the computing device of the first television system renders the video conference data.

* * * * *